Aug. 14, 1945.        D. MEGAR            2,382,249
                      SPRING BAR
                 Filed Aug. 14, 1943       2 Sheets-Sheet 1
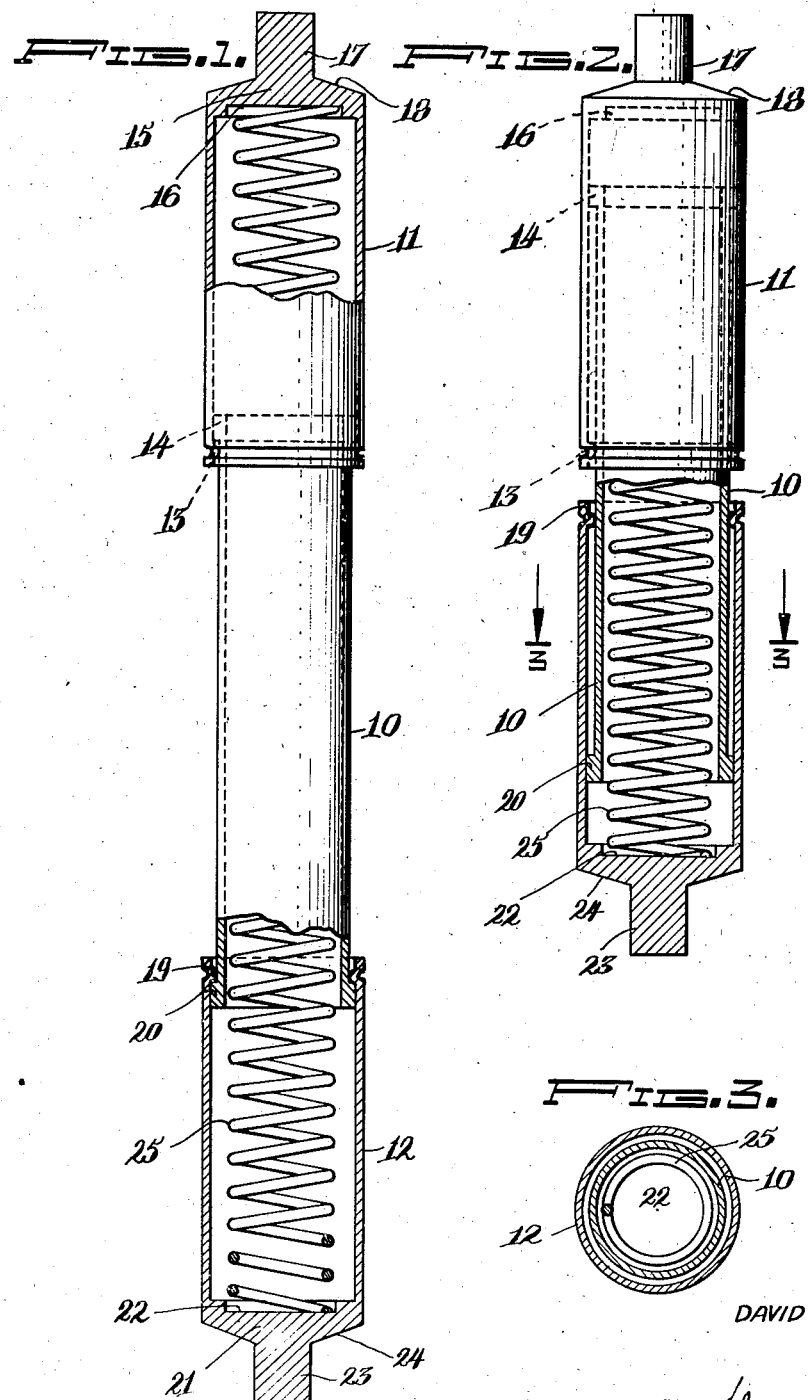
DAVID MEGAR
    INVENTOR.
BY
         ATTORNEY.

Aug. 14, 1945.  D. MEGAR  2,382,249
SPRING BAR
Filed Aug. 14, 1943  2 Sheets-Sheet 2
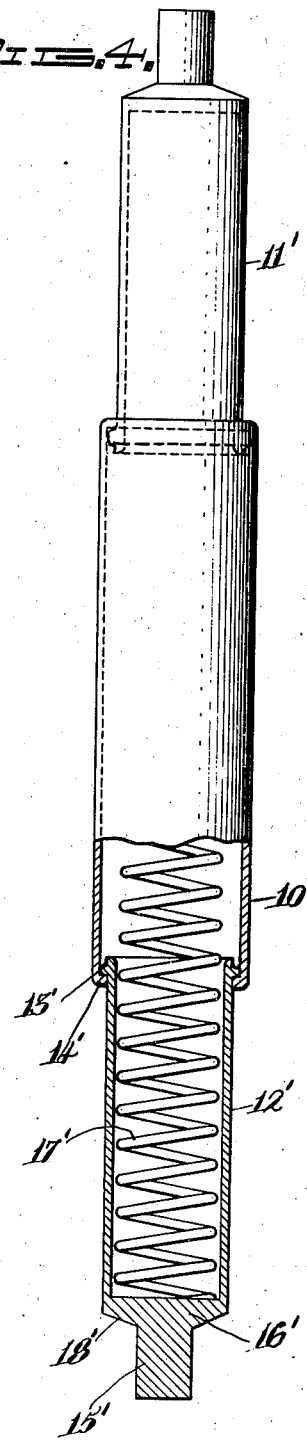
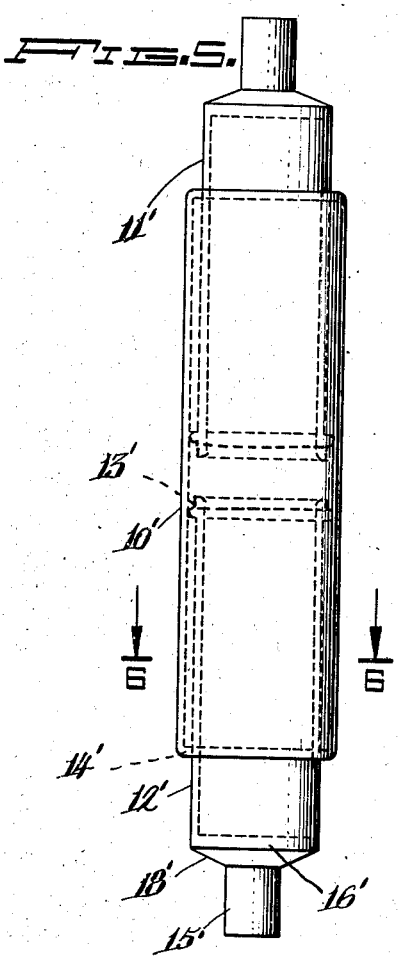
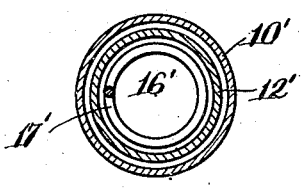
DAVID MEGAR
INVENTOR.

Patented Aug. 14, 1945

2,382,249

UNITED STATES PATENT OFFICE 2,382,249

SPRING BAR

David Megar, New York, N. Y.

Application August 14, 1943, Serial No. 498,718

2 Claims. (Cl. 24—265)

This invention relates generally to spring bars, but more specifically to a spring bar to accommodate various distances between openings in a mounting member associated with wrist-watches and the like.

The main object of the invention resides in the provision of a spring bar wherein the trunnions thereof are retractable in opposite directions along the length of the spring bar tube to a position substantially intermediate the length thereof.

A further object of the invention resides in the provision of tubular trunnions in slidable engagement with the spring bar tube wherein a spring passing through the tube is compressed between the outer closed ends of the trunnions allowing extensive retractability and resiliently urged functional outer positions of the trunnions.

Another object of the invention resides in the construction of a spring bar of the above nature which is suitable for use with mounting members having blind openings and wherein the trunnion members substantially throughout the length thereof are of uniform diameter.

Another object of the invention is to produce a strong spring bar which will accommodate different lengths between the openings of the mounting member within greater limits than has been heretofore possible and which can be easily and quickly assembled.

These objects and other incidental ends and advantages will hereinafter appear in the progress of the disclosure and as pointed out in the appended claims.

Accompanying this specification are drawings showing a preferred form of the invention wherein the trunnions are slidably mounted on and externally of the main tube and other preferred form of the invention wherein the trunnions are slidably mounted internally of the main tube. In the drawings corresponding reference characters designate corresponding parts of the several views, the views being as follows:

Figure 1 is a longitudinal view of the spring bar having externally mounted trunnions, the view being in elevation and partly sectioned.

Figure 2 is a longitudinal view in elevation partly sectioned showing the trunnions in full retracted positions.

Figure 3 is a sectional view of Figure 2 through the plane 3—3 thereof.

Figure 4 is a longitudinal view in elevation partly sectioned of another form of spring bar wherein the trunnions are internally slidable with respect to the tube.

Figure 5 is a view in elevation showing the spring bar of Figure 4 in full retracted position.

Figure 6 is a transverse sectional view of Figure 5 through the plane 6—6 thereof.

In accordance with the invention and the preferred forms thereof shown in the drawings, there is provided a main tubular member 10 on the external periphery of which similar and opposite tubular trunnions 11 and 12 are adapted to slide. Trunnion 11 is provided with an annular internal bead 13 suitably formed adjacent the inner edge and which is adapted to abut the annular stop shoulder formed from an out-turned annular bearing surface portion or expanded section 14 at one end of tube 10. It is to be observed that the internal diameter of trunnion 11 is slightly more than the external diameter of flange 14 while the external diameter of tube 10 is slightly less than the internal diameter of bead 13. Such dimensioning allows trunnion 11 to be in a slidable fit with tube 10 and the parts 13 and 14 serve as limits for the outermost position of trunnion 11.

At the end of trunnion 11 is a closed wall 15 having a central annular recess 16 on the inner side and a reduced engaging member 17 proceeding axially outwardly and adapted to fit the opening of a mounting member. The shoulder 18 formed between the engaging member 17 and the wall 15 is preferably inclined upwardly toward the longitudinal axis of trunnion 11 to facilitate removal of the spring bar from the mounting member as will hereinafter more fully be described.

The opposite trunnion 12 is similarly provided with an internal bead 19 suitably formed adjacent the inner edge engaging the shoulder formed from the outwardly turned or expanded annular section 20 of tube 10 while the opposite end of trunnion 12 is provided with a similar closed wall 21 having a central annular recess 22 on the lower side and having a reduced engaging member 23 for the opposite opening in the mounting member. The shoulder 24 formed between wall 21 and engaging member 23 is similarly upwardly inclined toward the longitudinal axis of trunnion 12.

Compressed between annular recesses 16 and 22 and passing through tube 10 is a spring 25 which normally urges trunnions 11 and 12 in outward and functional position. By virtue of the length of spring 25, it is seen that trunnions 11 and 12 are given a wide spread between retracted positions and maximum functioning positions in a mounting member to enable the spring bar to fit a series of mounting members wherein the distance between the openings vary within reasonable limits. Such a construction considerably reduces the number of sizes of spring bars that must be manufactured to accommodate mounting members having varying distances between the openings.

The purpose of having shoulders 18 and 24 inclined is to permit the removal of the spring bar from a mounting member having blind openings by inserting an instrument in the wedges formed between such inclined shoulders and the walls surrounding the openings of the mounting member so that either trunnion may be retracted to angle out the spring bar for removal.

In assembling and constructing the spring bar, either trunnion such as 11 is passed over tube 10 and then the internal annular bead or reduced section 13 is suitably formed to engage flange or expanded section 14 as a stop member. Thereafter, the spring 25 is inserted through tube 10 and the other trunnion 12 is passed over the opposite end of tube 10 and the internal bead or reduced section 19 is formed thereon to engage with the section 20, the trunnion last inserted being held against the compression spring 25.

In the form of the invention shown in Figures 4, 5 and 6 trunnions 11' and 12' are adapted to slide along the inner periphery of tube 10', each trunnion having an outer bead or flange 13' adjacent the inner edge adapted to engage with an inturned end flange or reduced section 14' on the tube, the said parts cooperating to act as stops for the outermost position of the trunnions. The external diameter of bead 13' is slightly less than the internal diameter of tube 10' while the external diameter of trunnion 12' is slightly less than the internal diameter of section 14'. Each of the trunnions 11' and 12' are similarly provided with reduced engaging members 15' on end walls 16', the spring 17' being adapted to be compressed between the inner sides of the walls 16', the latter having inclined shoulders 18'. In assembling the spring bar of Figures 4, 5 and 6 the inturned edges 14' are formed after the trunnions 12' are inserted in tube 10'.

Although the spring bars described in detail show merely preferred forms of the invention, I wish it understood that the invention also covers other forms encompassed within the scope of the appended claims.

I claim:

1. A spring bar connection comprising an elongated tubular body having cylindrical bearing surfaces at each end of greater diameter than the intermediate portion of the body and providing annular stop shoulders adjacent said ends, tubular trunnions slidably mounted on the bearing surfaces at opposite ends of the body and having their inner ends reduced in diameter to slidably engage the body between said end bearing surfaces, and a compression spring mounted within the body and trunnions and normally urging the reduced ends of the trunnions toward opposite ends of the body.

2. The structure defined in claim 1, in which the cylindrical body is externally flanged to provide end bearing surfaces and the tubular trunnions are reduced at their inner ends to provide annular beads for slidably engaging the body between the bearing surfaces thereof.

DAVID MEGAR.